July 29, 1930.  M. BLOKKER  1,771,395
SAW SET
Filed May 18, 1927
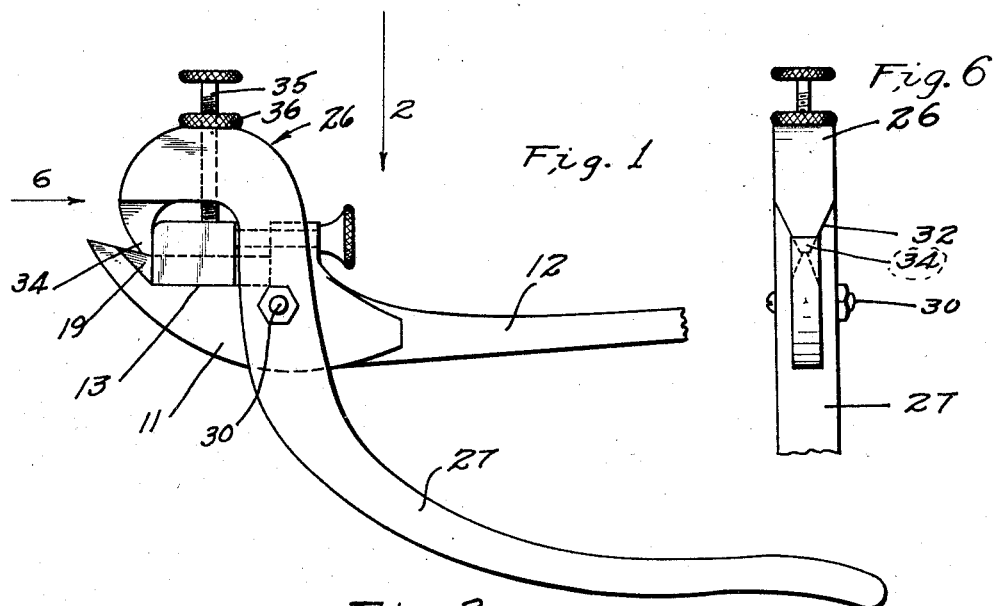
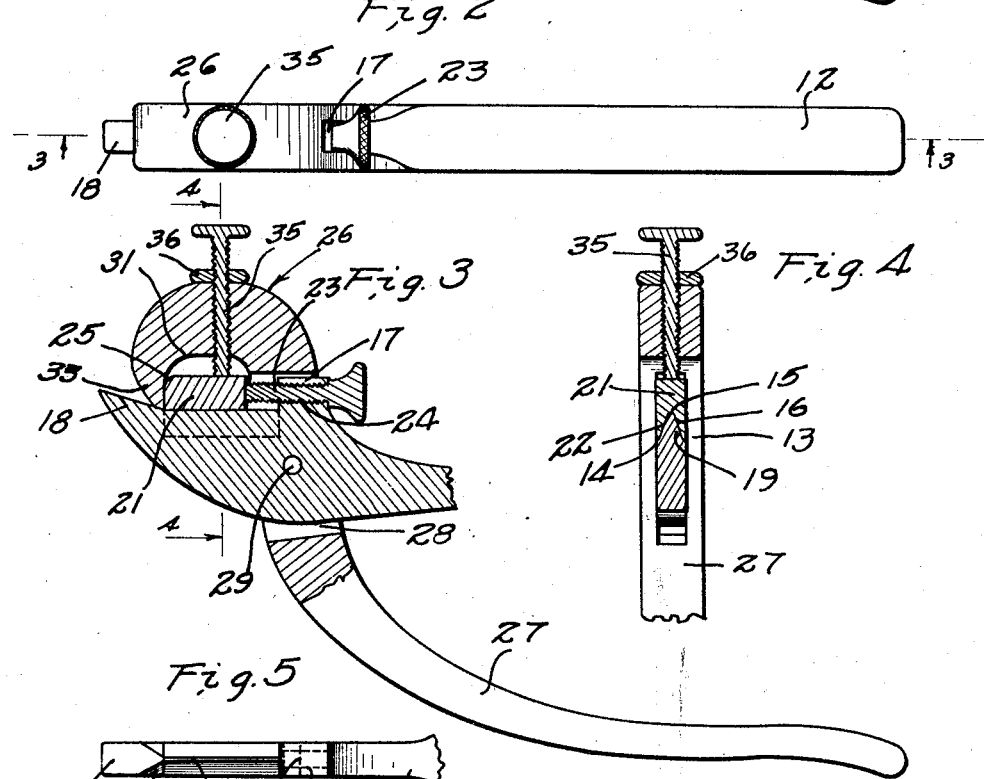
INVENTOR
M. BLOKKER
By Hazard and Miller
Attorneys Patented July 29, 1930

1,771,395

UNITED STATES PATENT OFFICE

MARTIN BLOKKER, OF WILMAR, CALIFORNIA

SAW SET

Application filed May 18, 1927. Serial No. 192,282.

My invention is a saw set of the pliers type.

An object of my invention is the construction of a saw set of the pliers type, having a slidable supporting member on one of the jaws, with means to adjust the position of the supporting member on such jaw. The other or setting jaw has a curved part which extends over and grips a saw tooth between such jaw and the end of the supporting member, there being a limit stop to limit the movement of the jaws together to give the proper set to the saw.

My invention is illustrated in the accompanying drawings, in which:

Figure 1 is a side elevation of my saw set.

Figure 2 is a plan view of the set taken in the direction of the arrow 2 of Fig. 1.

Figure 3 is a longitudinal section on the line 3—3 of Fig. 2 in the direction of the arrows.

Figure 4 is a transverse section on the line 4—4 of Fig. 3.

Figure 5 is a detail plan view of the lower jaw.

Figure 6 is an end view taken in the direction of the arrow 6 of Fig. 1.

The lower jaw 11 of my saw set has a handle 12 connected thereto and is provided with a slideway 13 at its forward end. This slideway has lower shoulders 14 and an upper flat edge 15, with tapered sides 16 joining the shoulders and the top surface. Rearwardly on this slideway is a lug 17 and at the forward end there is an upwardly tilted supporting point 18, having cut away side sections 19 whereby the surface of the supporting point has a narrow rear end 20.

A supporting member 21 has a longitudinal groove 22 in the lower edge to fit on the slideway 13 and this supporting member is moved longitudinally of the slideway by means of a screw 23 which passes through an opening 24 in the lug 17. The front end of the supporting member has a rounded corner 25.

The pressing jaw 26 has a handle 27, this jaw having an opening 28 through which the jaw 11 extends, there being registering apertures 29 with a pivot bolt 30 therethrough, thus securing the jaws together. This pressing jaw is formed arcuate with a concave curve 31 on the lower part. This jaw has converging sides 32 and with the inwardly curved outer surface 33 the jaw terminates substantially in a dull point 34. An adjusting screw 35 extends downwardly through the pressing jaw 26 and this screw is adapted to engage the top of the supporting member as shown in Figs. 1, 3 and 4, there being a lock nut 36 to secure such adjusting screw in proper position.

The manner of operation and use of my saw set is substantially as follows:

The supporting member is adjusted in the slideway 13 by means of the screw 23 in order to position the outer end and the curved nose 25 in proper relation to the outer part of the pressing jaw, that is to have the dull point 34 of such jaw operate in an arc at a greater radial distance from the pivot bolt 30 than the rounded corner 25 of the supporting member 21. The adjusting screw 35 is adjusted in the presser jaw 26 limiting the movement of the jaws together by such screw engaging the top of the anvil. The jaws 11 and 26 are then separated and the saw to be set is placed with the toothed edge between the jaws in such position that one of the teeth rests adjacent its point upon the rounded corner 25 of the supporting member 21, and the blade of the saw rests adjacent the base of the same tooth upon the supporting point 18. The jaw 26 is then pressed toward the jaw 11 by squeezing the handles 12 and 27 together, whereupon the point 34 of the upper jaw 26 will engage the saw tooth between the points of suspension thereof, to wit, the corner 25 and the point 18, and upon the opposite face of the tooth. Thus it is readily apparent that by exerting pressure upon the handles 12 and 27, the tooth may be bent to one side, it being understood that the back of the saw is free to swing upwards as the bending takes place. The amount of this bending or the extent of the set is limited by the engagement of the adjusting screw 35 with the top of the supporting member 21; and the adjustability of the supporting member 21 upon its supporting jaw 11, permits varying the distance between the points of support 25 and 18, so as to accommodate teeth of different sizes. It is to be understood that the alternate teeth of the saw should be pressed to one side in this manner, and then the saw turned over and the remaining teeth pressed to the opposite side.

Various changes may be made in the principles of my invention without departing from the spirit thereof, as set forth in the description, drawings and claims.

I claim:

1. A saw set comprising in combination a first jaw having a longitudinal slideway, a handle substantially parallel to the slideway and a supporting point extending upwardly from the slideway, said jaw having a lug; a supporting member slidably mounted on the slideway between the lug and the supporting point, a first adjusting screw extending through said lug and engaging the supporting member, a second jaw having a part pivotally connected to the first jaw and normally substantially at right angles thereto, said jaw being formed arcuate with an inner concave curve, the free end of said latter jaw terminating in a dull point and being adapted to pass between the outer part of the supporting member and said supporting point, and a second adjusting screw extending through the arcuate jaw to engage the supporting member.

2. A saw set, as claimed in claim 1, the slideway on the first jaw having upwardly converging sides with shoulders at the base of the sides and a flat edge at the top, the supporting member having a rounded corner adapted to fit the concave inner surface of the second jaw.

3. A saw set, as claimed in claim 1, the arcuate jaw having opposite converging sides and a convex outer surface, the converging sides and the convex surface with the inner concave curve forming an operating point.

4. A saw set comprising in combination a first jaw having a substantially straight slideway, and a handle parallel to said slideway, a supporting member slidable on the slideway, the said jaw having a lug with a first adjusting screw extending therethrough and engaging the supporting member, a second jaw pivotally connected to the first jaw and having a part at substantially right angles to the slideway, the said latter jaw being formed arcuate with a concave inner curve, the free end of said jaw being adapted to pass between the outer part of the supporting member and said supporting point, the arcuate jaw having an adjusting screw extending therethrough, said latter screw engaging the top of the supporting member.

5. A saw set comprising a pair of pivotally connected jaws having handles, a supporting member carried by one of said jaws, a saw supporting point rigid with the same jaw, and a saw tooth engaging point rigid with the other jaw and movable by pivoting the handles in respect to each other to a position between the supporting member and the associated jaw point.

6. A saw set comprising a pair of pivotally connected jaws having handles, a supporting member carried by one of said jaws, a saw supporting point rigid with the same jaw, a saw tooth engaging point rigid with the other jaw and movable by pivoting the handles in respect to each other to a position between the supporting member and the associated jaw point, and means for varying the distance between said supporting member and its associated point.

7. A saw set comprising a pair of pivotally connected jaws having handles, a supporting member carried by one of said jaws, a saw supporting point rigid with the same jaw, a saw tooth engaging point rigid with the other jaw and movable by pivoting the handles in respect to each other to a position between the supporting member and the associated jaw point, and means limiting the movement of said saw tooth engaging point toward the other jaw.

8. A saw set comprising a pair of pivotally connected jaws having handles, a supporting member carried by one of said jaws, a saw supporting point rigid with the same jaw, a saw tooth engaging point rigid with the other jaw and movable by pivoting the handles in respect to each other to a position between the supporting member and the associated jaw point, means for varying the distance between said supporting member and its associated point, and means for limiting the movement of said saw tooth engaging point toward the other jaw.

In testimony whereof I have signed my name to this specification.

MARTIN BLOKKER.